(12) United States Patent
Jauhal et al.

(10) Patent No.: US 11,240,209 B2
(45) Date of Patent: *Feb. 1, 2022

(54) DATA TRANSFER IN A DATA PROTECTION SYSTEM

(71) Applicant: EMC IP Holding Company LLC, Hopkinton, MA (US)

(72) Inventors: Shern S. Jauhal, Palo Alto, CA (US); Scott Quesnelle, Burlington (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/557,333

(22) Filed: Aug. 30, 2019

(65) Prior Publication Data

US 2019/0386998 A1 Dec. 19, 2019

Related U.S. Application Data

(63) Continuation of application No. 15/583,807, filed on May 1, 2017, now Pat. No. 10,404,705, which is a
(Continued)

(51) Int. Cl.
*H04L 29/06* (2006.01)
*G06F 21/62* (2013.01)
(Continued)

(52) U.S. Cl.
CPC .............. *H04L 63/04* (2013.01); *G06F 11/14* (2013.01); *G06F 11/16* (2013.01);
(Continued)

(58) Field of Classification Search
CPC .............. G06F 21/606; G06F 11/1469; G06F 11/1458; G06F 11/14; G06F 11/16;
(Continued)

(56) References Cited

U.S. PATENT DOCUMENTS 6,704,886 B1  3/2004 Gill et al.
7,330,997 B1  2/2008 Odom
(Continued)

FOREIGN PATENT DOCUMENTS

CN        101795206 A      8/2010
WO    WO 2014/062191       4/2014

OTHER PUBLICATIONS

Ahmad et al., "Survey on secure live virtual machine (VM) migration in Cloud," 2013 2nd National Conference on Information Assurance (NCIA) Year: 2013 pp. 101-106.*
(Continued)

*Primary Examiner* — Roderick Tolentino
(74) *Attorney, Agent, or Firm* — Workman Nydegger

(57) ABSTRACT

Systems and methods for performing a data transfer in a data protection system are disclosed. A user interface is provided that includes a workflow. The workflow is effective to configure a data transfer by identifying the source of the data, the destination of the data, and the data itself. A data control process associated with the data protection system is performed to authenticate the requesting user and determine whether the user is authorized to access the data. The data is transferred in accordance with the data control process of the data protection system.

20 Claims, 3 Drawing Sheets

Related U.S. Application Data continuation of application No. 13/930,004, filed on Jun. 28, 2013, now Pat. No. 9,641,486.

(51) Int. Cl.
*G06F 11/16* (2006.01)
*G06F 11/14* (2006.01)
*H04L 29/08* (2006.01)

(52) U.S. Cl.
CPC .......... *G06F 21/6218* (2013.01); *H04L 63/08* (2013.01); *H04L 63/10* (2013.01); *H04L 67/06* (2013.01)

(58) Field of Classification Search
CPC . G06F 21/6218; H04L 63/10; H04L 67/1002; H04L 63/20; H04L 63/04; H04L 63/08; H04L 67/06
USPC ..................................................... 726/26–30
See application file for complete search history.

(56) References Cited

U.S. PATENT DOCUMENTS

| | | | |
|---|---|---|---|
| 7,360,110 B1 | 4/2008 | Schmokel et al. | |
| 7,523,097 B1 | 4/2009 | Wilson | |
| 7,558,840 B1 | 7/2009 | Howard et al. | |
| 7,653,714 B2 | 1/2010 | Yagishita | |
| 8,151,140 B2 | 4/2012 | Sim-Tang | |
| 8,161,321 B2 | 4/2012 | Zheng | |
| 8,260,747 B2 | 9/2012 | Wu et al. | |
| 8,316,237 B1 | 11/2012 | Felsher | |
| 8,365,017 B2 | 1/2013 | Sim-Tang | |
| 8,375,248 B2 | 2/2013 | Sim-Tang | |
| 8,464,101 B1 | 6/2013 | Natanzon | |
| 8,635,189 B1 | 1/2014 | Tenzer | |
| 9,020,896 B1 | 4/2015 | Tsaur | |
| 9,201,887 B1 | 12/2015 | Earl et al. | |
| 9,641,486 B1 | 5/2017 | Jauhal et al. | |
| 9,703,618 B1 | 7/2017 | Jauhal | |
| 9,904,606 B1 | 2/2018 | Jauhal | |
| 10,235,392 B1 | 3/2019 | Jauhal | |
| 10,353,783 B1 | 7/2019 | Jauhal | |
| 10,404,705 B1 | 9/2019 | Jauhal et al. | |
| 2003/0167408 A1* | 9/2003 | Fitzpatrick | G06F 21/62 713/193 |
| 2004/0015578 A1 | 1/2004 | Karakashian et al. | |
| 2004/0117548 A1 | 6/2004 | Zamer | |
| 2005/0022176 A1 | 1/2005 | Ramachandran et al. | |
| 2005/0149577 A1 | 7/2005 | Okada et al. | |
| 2005/0216788 A1 | 9/2005 | Mani-Meitav et al. | |
| 2005/0240815 A1 | 10/2005 | Purkeypile | |
| 2006/0004675 A1 | 1/2006 | Bennett | |
| 2006/0010107 A1 | 1/2006 | Nguyen et al. | |
| 2006/0059253 A1 | 3/2006 | Goodman et al. | |
| 2006/0184828 A1 | 8/2006 | Wynn | |
| 2006/0242626 A1 | 10/2006 | Pham et al. | |
| 2007/0162739 A1* | 7/2007 | LaCous | G06F 21/32 713/150 |
| 2007/0168656 A1* | 7/2007 | Paganetti | G06F 21/31 713/155 |
| 2007/0185922 A1 | 8/2007 | Kapoor et al. | |
| 2007/0271314 A1 | 11/2007 | Ban | |
| 2008/0154989 A1* | 6/2008 | Arman | G06F 11/1456 |
| 2009/0037517 A1 | 2/2009 | Frei | |
| 2009/0164529 A1 | 6/2009 | McCain | |
| 2009/0172689 A1 | 7/2009 | Bobak et al. | |
| 2010/0074147 A1* | 3/2010 | Decasper | H04L 12/4641 370/254 |
| 2010/0274983 A1 | 10/2010 | Murphy | |
| 2011/0004629 A1* | 1/2011 | Thorat | H04L 41/084 707/783 |
| 2011/0154014 A1* | 6/2011 | Thorn | H04M 1/7253 713/150 |
| 2011/0161465 A1 | 6/2011 | Kowalski | |
| 2011/0179415 A1* | 7/2011 | Donnellan | G06F 9/45558 718/1 |
| 2011/0238937 A1* | 9/2011 | Murotani | G06F 3/0689 711/162 |
| 2011/0246416 A1 | 10/2011 | Prahlad et al. | |
| 2012/0066612 A1 | 3/2012 | Virmani | |
| 2012/0079221 A1* | 3/2012 | Sivasubramanian | G06F 11/1456 711/162 |
| 2012/0124443 A1 | 5/2012 | Kwak | |
| 2012/0159595 A1* | 6/2012 | Barham | H04L 67/1095 726/7 |
| 2012/0233417 A1 | 9/2012 | Kalach et al. | |
| 2013/0061089 A1 | 3/2013 | Valiyaparambil et al. | |
| 2013/0074082 A1 | 3/2013 | Yu | |
| 2013/0151414 A1* | 6/2013 | Zhu | G06Q 20/3552 705/44 |
| 2013/0268925 A1 | 10/2013 | Fuse | |
| 2014/0019414 A1 | 1/2014 | Abraham et al. | |
| 2014/0082167 A1 | 3/2014 | Robinson et al. | |
| 2014/0089266 A1 | 3/2014 | Une et al. | |
| 2014/0173581 A1 | 6/2014 | Grinberg | |
| 2014/0298490 A1* | 10/2014 | Clark | G06F 21/40 726/34 |
| 2014/0304830 A1* | 10/2014 | Gammon | G06F 21/60 726/27 |
| 2014/0379660 A1 | 12/2014 | Vorsprach et al. | |
| 2015/0161013 A1 | 6/2015 | Cheng | |
| 2015/0205979 A1 | 7/2015 | Dong | |
| 2018/0189150 A1 | 7/2018 | Jauhal | |
| 2019/0213174 A1 | 7/2019 | Jauhal | |
| 2019/0340086 A1 | 11/2019 | Jauhal | |
| 2019/0386998 A1 | 12/2019 | Jauhal et al. | |

OTHER PUBLICATIONS

Demchenko et al., "Access control infrastructure for on-demand provisioned virtualised infrastructure services," 2011 International Conference on Collaboration Technologies and Systems (CTS) Year: 2011 pp. 466-475.*
U.S. Application Filed on Feb. 27, 2018, by Jauhal, Shern S., U.S. Appl. No. 15/906,300.
U.S. Application Filed on Jun. 26, 2013, by Shern S., U.S. Appl. No. 13/927,400.
U.S. Application Filed on Jun. 26, 2013, by Shern S., U.S. Appl. No. 13/927,432.
U.S. Application Filed on Jun. 26, 2013, by Shern S., U.S. Appl. No. 13/927,466.
U.S. Application Filed on Jun. 28, 2013, by Jauhal et al., U.S. Appl. No. 13/930,004.
U.S. Application Filed on Jun. 28, 2013, by Shern S., U.S. Appl. No. 13/930,278.
U.S. Appl. No. 13/931,609, filed Jun. 28, 2013, Jauhal, Shern S.
U.S. Appl. No. 16/511,246, filed Jul. 15, 2019, Jauhal, Shern S.
Google English translation of Chinese Application CN101795206 (A)—Aug. 4, 2010.

* cited by examiner

DATA TRANSFER IN A DATA PROTECTION SYSTEM

BACKGROUND OF THE INVENTION

1. The Field of the Invention

Embodiments of the present invention relate to transferring data. More particularly, embodiments of the invention relate to systems and methods for transferring data or files in the context of a data protection system.

2. The Relevant Technology

Computers have become ubiquitous in our society and many people interact with computers every day. People use computers to work on documents, spreadsheets, or presentations, create computer code, generate and maintain databases, send email, or the like. Computers are also used, for example, to conduct online activities such as shopping or surfing.

Often, data is accessed in the context of a network (e.g., an IT system or environment). In fact, most entities and business maintain their own IT system. The data in the IT system can include documents, backups, log files, reports, or the like. Some of this data can be local to a particular host or generally available on network file server.

In any given IT system, a large number of applications may be running on a number of hosts. In addition, a large number of files may also be in use or be accessed in the IT system by the hosts. Further, some of these files may be local to particular hosts while other files or data may be stored in file servers. Sometimes, it becomes necessary to view or access a file that exists in the IT system. For example, a particular piece of software may log information to a local log file and a user on a remote device may require access to that file.

There are several ways to access the log file, or other data. A user can remotely log on to the host and a file transfer protocol may be employed to obtain the file. However, these methods can be cumbersome and are often insecure. In addition, conventional methods do not always provide sufficient authentication, authorization, or access control. This can result in extra work for users of the IT system and may lead to situations where the use of the file is unauthorized and the security is compromised.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF THE PREFERRED EMBODIMENTS

Figure 1:
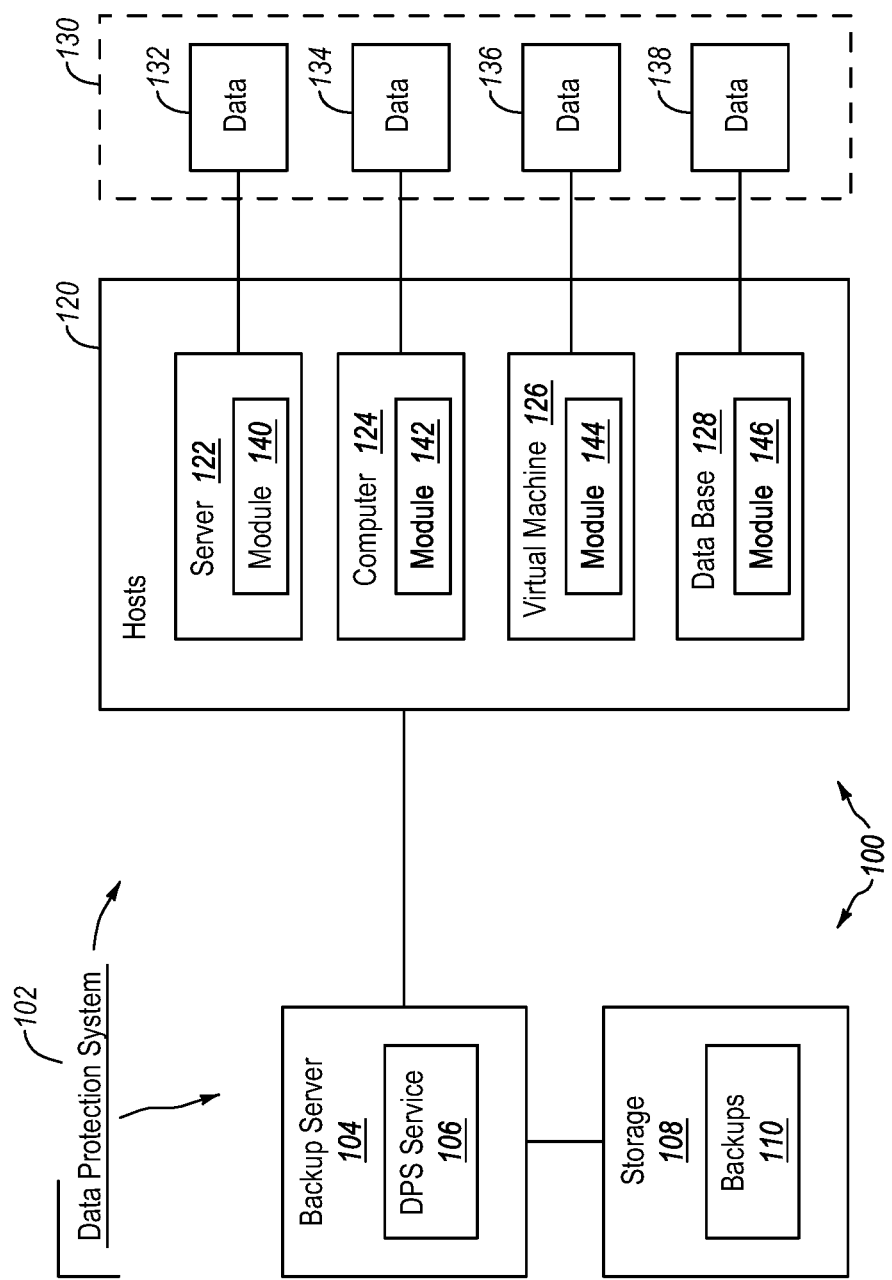
FIG. 1 illustrates an example of an environment that includes a data protection system configured to protect data.

Embodiments of the invention relate to systems and methods for protecting data. Embodiments of the invention relate to transferring data or files in a data protection system. Embodiments of the invention relate to a file transfer protocol in a data protection system. Embodiments of the invention enable a file transfer protocol that can incorporate functionality of the data protection system. When transferring data in the data protection system, the data protection system can authenticate the requesting user, authorize the requesting user, perform access control to the data, and enable auditing with respect to the data transfers.

In the data protection system, one or more agents may be operating on various devices. For example, each host may have a local agent. A data protection (e.g., backup server) may also have an agent or a data protection service. The agents operating on the hosts can access files or data on the local host or that are associated with the host. The agents can coordinate with the data protection service or with other agents to transfer the file. The agents can require a user to provide information that can authenticate the user, determine whether the user has authority to access the requested file, and determine how the requested file is accessed. In addition, each attempt to access the file, whether or not the access is successful, can be tracked for audit purposes. The infrastructure of the data protection system can be used to implement data transfer in an IT system or in other networks.

In addition, the transfer of data can be performed in different ways. The data can be transferred in parts or pieces. In fact, it may not be necessary to transfer the entire data if the transfer of a part of data includes the information required by the user. When the data is transferred, the data may be displayed to the requesting user before the transfer is complete. In addition, the data can be accessed randomly or from a specified location. For example, a user may attempt to access a large file at a location where the desired location is anticipated be exist.

The following discussion describes an example of a data protection system and illustrates the ability to transfer data or the ability to access data using the infrastructure or components of the data protection system.

The data protection system can include various modules or components that can be installed on different devices. Some modules of the data protection system may operate on a server computer while other modules may operate on another device or computer (e.g., a host machine or host). In addition, the data protection operations discussed herein can be configured from another device or performed from another device. In addition to recovery and backup operations, the data protection operations may include file transfer and file access operations.

The modules operating on the host and on the server cooperate to transfer and/or access data. In some instances, embodiments of then invention enable a file transfer to be scheduled for later execution.

The transfer of data may be initiated through a user interface (UI) regardless of how the host is configured. In the context of transferring data, embodiments of the user interface may have some common aspects that are independent of the data being transferred and may be independent on the host on which the data access request is made and/or the host on which the requested data resides. Embodiments of the user interface may also include pluggable aspects.

More specifically, in order to adapt a transfer operation to the specific characteristics of the host, embodiments of the user interface may contain a pluggable framework where part of the interface can be supplied as a plug-in from outside of the user interface. When performing or when configuring a data transfer operation, the appropriate plug-in may be loaded into or made available to the user interface as needed. For example, accessing a database may require certain configuration information that is different from the configuration information required for accessing a mailbox.

This enables the user interface to be adaptable and can enable the data transfer operation to avoid problems associated with different versions of software, different operating systems, or the like. The pluggable framework enables the same user interface to be adapted to the host, to the type of data transfer being performed and to the data itself.

FIG. 1 illustrates an example of an environment 100 (e.g., an IT (information technology) system) that includes a data protection system 102 configured to protect data. As previously stated, data can be protected by backing up the data and/or recovering or restoring the data and/or by configuring backup or recovery operations and/or by transferring data from one host to another host. The data protection system 102 in the environment 100 includes modules that are configured to backup data and/or recover data and/or transfer data.

The environment 100 may be a network such as a local area network, a wide area network, or any other networked configuration. The environment 100 may include various devices including servers and other computers that are interconnected. The data stored in the system and/or the software operating the environment 100 may be cloud based, network based, or single computer based or combination thereof. The data protection system 102 or portions thereof may be implemented in a cloud or internet environment or other networked environment.

The data protection system 102 is implemented in the environment 100. The components or modules of the data protection system 102 can be installed on multiple devices. The data protection system 102 can include both server side components or modules and device or host side components or modules. The various modules cooperate protect data in the environment 100. The data protection system 102 can include hardware and/or software aspects.

The data protection system 102 may include, by way of example only, a backup server 104. A data protection system (DPS) service 106 may be operating on the backup server 104 or on another computer that coordinates with the backup server 104. When protecting data (e.g., backup, recovery, data transfer), the DPS service 106 may interface with other agents (e.g., on hosts) operating the environment 100. The data protection system 102 may also include or be associated with storage 108. The storage 108 is configured to store backups 110, which are backups of data in the environment 100. The storage 108 may be networked storage, cloud based storage, disk arrays, tape media or the like or any combination thereof. In addition, aspects of file transfer discussed herein may transfer data from the backups 110 in a manner that is distinct from a recovery operation. The DPS service 106 may be web-enabled to enable remote access to the functionality of the data protection system 102 and to the backups 110.

FIG. 1 further illustrates that the environment 100 includes hosts 120. The number of hosts 120 can vary and can be of different types. In one example, the hosts 120 are all part of the same network or associated with the same entity (the environment 100 may be an IT system). The hosts 120 can include, by way of example only, servers 122 (e.g., a file server, an email server), computers 124 (e.g., desktop computers, laptop computers, tablet devices, smartphones), virtual machines 126, databases 128, or the like or any combination thereof. Each of the hosts 120 is often associated with its own data. The server 122 is associated with the data 132, the computer 124 is associated with the data 134, the virtual machines 126 have the data 136 (the storage for the virtual machines may an integral part of the virtual machines), and the database 128 is associated with the data 138.

Generally, the data 130 of the environment may be stored on a storage pool, on hard disk arrays, on networked storage or the like or any combination thereof. IN one embodiment, some of the storage for some of data 130 may be specific to a particular host. For instance, the data 138 (or portion thereof) of the database 128 may be resident on storage that is not available to other hosts. Other hosts may be similarly configured. More generally, however, the data 130 may be stored on multiple storage devices and/or in one or more media pools.

In the data protection system 102, the DPS service 106 cooperates with modules 140, 142, 144, and 146 to perform data transfer operation (and backup and/or recovery operations). In addition, the modules 140, 142, 144, and 146 may communicate directly with other modules to perform data transfer operations. For example, the module 146 may communicate with the module 144 to access the data 136.

Backup and/or recovery operations and/or data transfer operations can be performed for each of the hosts 120 individually. Transferring the data may involve aspects of the data protection system 102.

The backups 110 can include one or more backups of each of the hosts 120. Advantageously, the data of the hosts 120 can be recovered at different points of time. The backups 110 may include full backups, partial backups, snapshots, content addressed data, de-duplicated data, or the like or any combination thereof. As a result, data transfers may involve not only current versions of data, but also previous versions of the same data if necessary.

Figure 2:
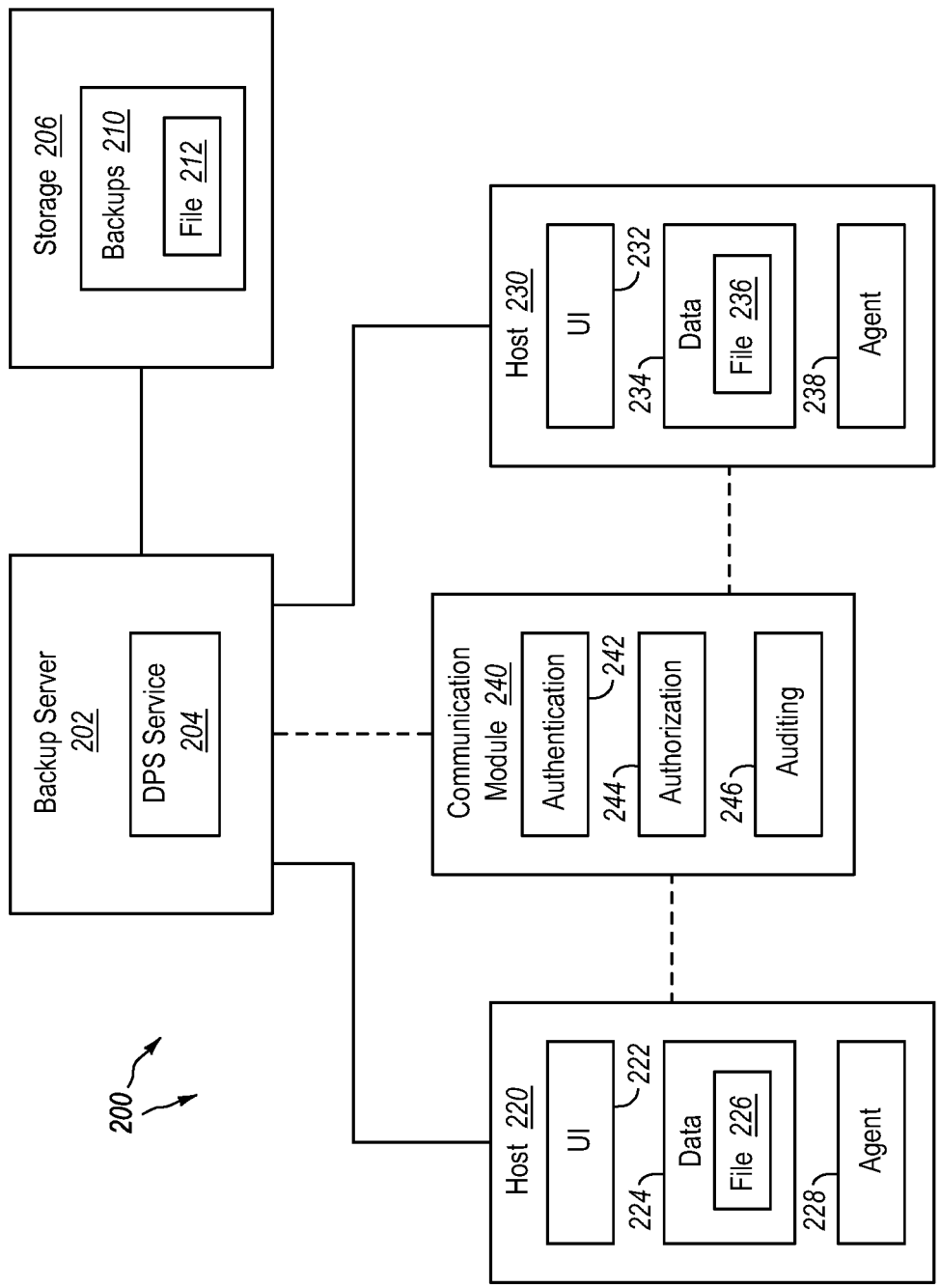
FIG. 2 illustrates an example of a backup server and hosts in the context of a data protection system where the infrastructure of the data protection system is used to access files in the environment.

FIG. 2 illustrates an example of a backup server and hosts in the context of a data protection system where the infrastructure of the data protection system is used to access data such as files. The backup server 202 is associated with storage 206. Backups 210 of data in the system 200 are stored on the storage 206. The backups 210 may include data such as a file 212. The data protection system in the system 200 can transfer the file 212 to another server or to another host.

FIG. 2 also illustrates a host 220 and a host 230. The host 220 is associated with data 224 and the host 230 is associated with data 234. The data 224 and 234 may be local to the respective hosts or may be stored on a medial pool or other storage device.

The hosts 220 and 230 also include or have operating thereon, respectively, user interfaces 222 and 232, and agents 228 and 238. A description of the host 220 can be equally applied to the host 230.

When transferring data, which may include requesting data from another host (e.g., a server, a computer, a storage device, etc.) in the system 200, the user interface 222 is displayed to a user of the host 220. The user interface cooperates with the agent 228 and the agent 228 performs tasks associated with the transfer of data. More specifically, when requesting data from the host 230, the agent 228 may communicate with the agent 238. When the host 220 requests data from the storage 206, the agent 228 may communicate with an agent of the DPS service 204.

The backup server 202 is an example of the backup server 104 and the hosts 220 and 230 are each examples of one of the hosts 120.

The DPS service 204 coordinates modules on the hosts 220 and 230 as previously described to configure and/or perform the recovery or backup operation to protect data of the host 212. The DPS service 204 may be web enabled. This allows a user to configure a recovery operation for the host 212 from another location or device. In one example, a user at the host 220 could initiate a request for the file 236 from another host in the system 200 or from the server 202. The user interface and plug in presented over the web interface may be the same as the user interface used at the host 220 for a recovery operation.

When transferring data, the user interface 222 is initiated on the host 220 in one example. The user interface 222 may then present a series of screens or a workflow that enables the data transfer operation to be configured. Tasks associated with the workflow, once configured, may be executed by the agent 228 in conjunction with another agent.

For example, the workflow presented in the user interface may collect information related to the data transfer. The configuration information may include, a location of the data to be requested, the credentials of the user, a schedule for requesting the data, a destination of the requested data, a format of the data, or the like or any combination thereof.

Once the configuration information is collected and stored, the agent 228 may perform the tasks necessary to perform the data transfer. The agent 228 may first use a communication module 240 (which may be a plug-in or may reside on the host 220, by way of example only) to perform authentication 242, authorization and auditing 246.

The authentication 242 may include validating the username and/or password of the user of the host 220. If the user cannot be authenticated, then the transfer of the data fails. In addition, the failure is logged due to the auditing 246. In other words, both successful and unsuccessful data transfers may be logged and subject to auditing at a later time for instance.

If the user is authenticated during authentication 242, then authorization 244 may be performed. This can include access control to determine whether the user has the rights to access the requested file. If the user does not have the authority to access or view the requested file, this is also logged during auditing 246.

When the user is authenticated and authorized, the agent may identify from the configuration information that the file 236 from the host 230 has been requested. The specific data and the location of the data may also be relevant to the authorization 244 aspect of data transfer. In this case, the agent 228 may cooperate with the agent 238 and/or the DPS service 204 to transfer the file 236 from the host 230 to the host 220. The transferred file 236 may be displayed in the user interface 222 or by an appropriate application based on file type.

As part of the configuration information, a user may be able to specify which part of the file 236 is of interest. For example, if the file 236 is a large log file, the agent 228 may coordinate with the agent 238 to access the part of the file 236 that is likely to include the part of interest. This can conserver network resources by only transferring part of the file 236.

Figure 3:
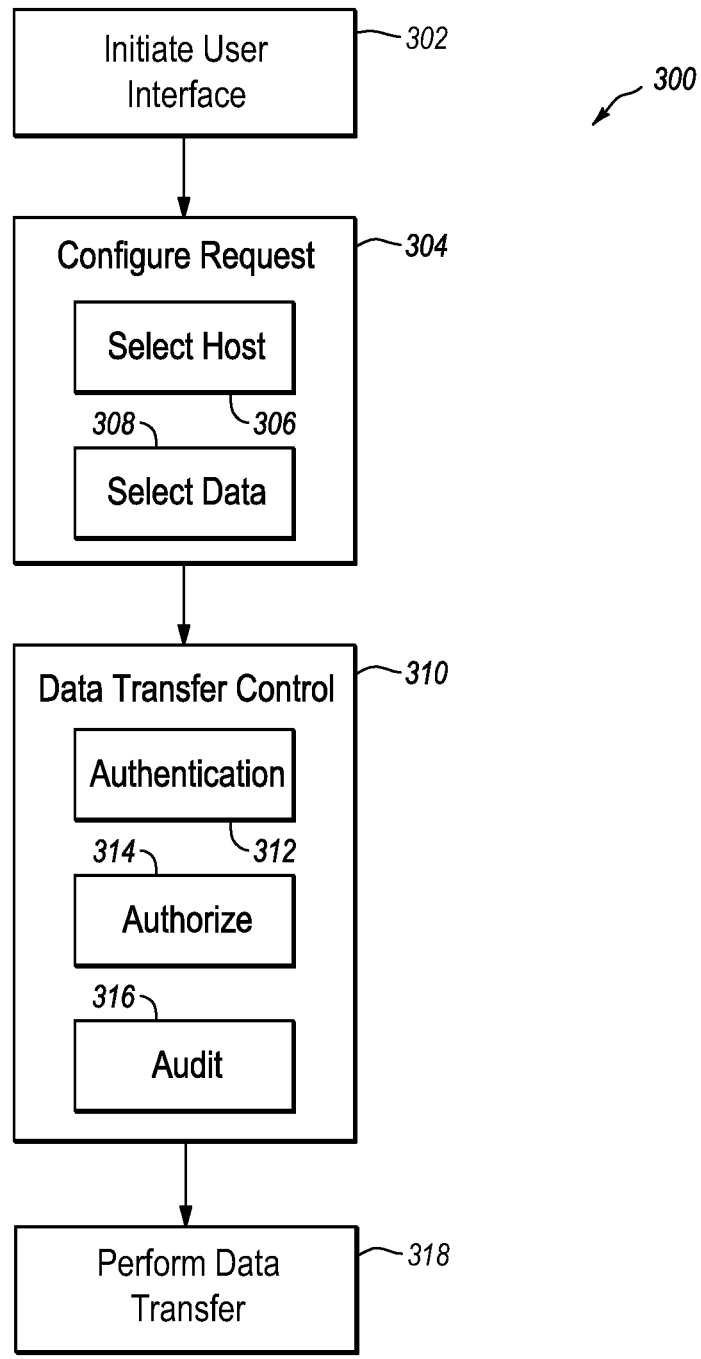
FIG. 3 illustrates a flow diagram of an example for accessing data in a computing environment.

FIG. 3 illustrates a flow diagram of an example for accessing or transferring data in a computing environment.

In box 302, a user interface is initiated. The user interface is typically initiated on a host on which the data for transfer is made. However, the user interface may be initiated in a remote manner.

In box 304, the data transfer request 304 is configured. Configuring the data transfer can include selecting the host in box 306 and selecting the data in box 308. The selected data may be a backup file or portion thereof or a file or portion thereof residing on a host or a media pool of the network. Configuring the data transfer may also include identifying how to access the selected data (e.g., randomly, at a particular location, or the like). Configuring the data transfer may also include identifying a destination of the data transfer. The host on which the data transfer is configured may be a default destination for the data. In some examples, a start point is identified for the data access. For example, the requested file may be accessed at the middle or near the end, or the like.

In box 310, a data transfer control is performed. The data transfer control in box 310 can be performed when configuring the data transfer or prior to performing the data transfer, or as part of the data transfer process. The data transfer control 310 may also be part of backup and/or recovery operations. In order to perform a backup and/or recovery operation, the data protection system may perform authentication of the user, authorization of the user, and perform an audit.

These aspects of the data protection system are also incorporated into the data transfer request. In box 312, authentication is performed. This may be username/password authentication or the like. In box 314, authorization is performed. This may include performing access control and determining the type of access the user has to the requested data. The data transfer may fail in the event that the user is not authenticated or in the event that the user does not have appropriate authorization. In box 316, an audit is performed to maintain a record of data access, successful transfers, failed transfers, and the like.

In box 318, the data transfer is performed when the data transfer control in box 310 is successful. Performing the data transfer may include transferring the requested data or file in pieces, randomly accessing the requested file, or the like.

In one example, the DPS system 102 can protect the data of a host through, by way of example, a series of periodic data protection events (e.g., snapshots or other backup). At some point in time, a request is made to transfer data in the system. The user interface on the host (or on another device) is started and a host is selected and data is identified. Depending on the type of data, it may be necessary to access a client backup module, which has information related to the way data is stored on the host and which may be used to generate a part of the workflow presented in the user interface.

Embodiments of the invention further relate to methods for transferring data in the infrastructure of a data protection system. Protecting the host in a data protection system can include backing up data, recovering data, and/or transferring data.

The user interface may present a workflow for transferring data. Through the user interface, the data transfer operation is configured. The workflow may include a data transfer control portion. By completing the workflow, the data transfer operation can be configured and/or scheduled and/or performed.

Portions of the workflow for the data transfer operation may be shared with backup and/or recovery operations. For example, the selection of a host may be performed in each case. The selection of data may also be shared with other workflows. Other portions of the workflow may depend on the selected client backup module and on the type of data being transferred and on the type of operation being configured and may be enabled by a plug-in that has been installed.

The agent operating on the host can cooperate with the workflow to perform tasks related to the workflow. For example, as a user inputs information or makes selections in the workflow or in the user interface, the agent may perform tasks based on this information or selections.

The embodiments described herein may include the use of a special purpose or general-purpose computer including various computer hardware or software modules, as discussed in greater detail below. Embodiments of the invention relate to methods for protecting data, devices configured to protect data, and computer-readable media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transferring or accessing data in a computing system using an infrastructure of a data protection system, the method comprising:
    performing a data protection operation by a data protection application associated with the data protection system in the computing system;
    in response to a request to transfer data in the computing system from a storage device to a location in the computing system by an application different from the data protection application, presenting a user interface, by the data protection application, that includes a workflow for transferring the data using an infrastructure of the data protection system, wherein the request processed by the data protection system is separate from the data protection operation;
    configuring the request to transfer data based on input received into the workflow presented in the user interface by adapting the user interface based on a first host, the request, and the data, wherein the data is stored at the first host;
    performing a data control process of the data protection system by the data protection application on the request; and
    transferring the data to the location by the data protection application, wherein transferring the data is separate from the data protection operation and wherein the location is different from a backup location configured to store backups generated by the data protection application.

2. The method of claim 1, wherein the data protection operation includes at least one of a backup operation or a restore operation.

3. The method of claim 1, further comprising receiving the request from the first host or a second host, wherein the location is associated with the second host.

4. The method of claim 1, further comprising operating a first agent on the first host, wherein the first agent is configured to perform the data protection operation and wherein the first agent is configured to transfer the data.

5. The method of claim 1, further comprising initiating the user interface, wherein the user interface is configured to collect configuration information related to the transfer of the data.

6. The method of claim 5, wherein the configuration information includes one or more of the location of the data on the storage device, credentials of a user, a schedule for requesting the data, the location in the computing system, or a format of the data.

7. The method of claim 1, wherein a portion of the workflow for transferring the data is shared with the data protection operation.

8. The method of claim 1, further comprising sharing a selection of the data with other workflows.

9. The method of claim 1, wherein the data control process includes authentication, authorization and auditing.

10. A method for performing an operation on data in a computing system using an infrastructure of a data protection system, the method comprising:
- initiating a user interface by the data protection application in response to a request to perform an operation on data from an application different from the data protection application, wherein the user interface includes a workflow for accessing data that is adapted based on a first host, the request, and the data, wherein the data is stored at the first host;
- configuring the request to perform the operation on the data based on input received into the workflow presented in the user interface, wherein the operation is not a data protection operation performed by the data protection system;
- performing a data control process of the data protection application on the request by the data protection application; and
- performing the operation on the data in accordance with the request by the data protection application, wherein the operation on the data is separate from the data protection operation performed by the data protection application.

11. The method of claim 10, wherein the data protection operation includes at least one of a backup operation or a restore operation and wherein the operation includes at least one of a data transfer operation, a write operation, or a read operation.

12. The method of claim 10, further comprising receiving the request from the first host, wherein the operation is associated with a second host.

13. The method of claim 12, further comprising operating an agent on the first host, wherein the agent is configured to perform the data protection operation and wherein the operation is performed when the data control process succeeds.

14. The method of claim 10, further comprising initiating the user interface, wherein the user interface is configured to collect configuration information related to the transfer of the data.

15. The method of claim 14, wherein the configuration information includes one or more of the location of the data on the storage device, credentials of a user, a schedule for requesting the data, the location in the computing system, or a format of the data.

16. The method of claim 10, wherein a portion of the workflow for the operation on the data is shared with the data protection operation.

17. The method of claim 10, further comprising sharing a selection of the data in the workflow with other workflows.

18. The method of claim 10, wherein the data control process includes authentication, authorization and auditing.

19. The method of claim 18, further comprising failing the operation when the authentication or the authorization fails.

20. A non-transitory computer readable medium comprising computer executable instructions configured to perform operations comprising:
- initiating a user interface by the data protection application in response to a request to perform an operation on data from an application different from the data protection application, wherein the user interface includes a workflow for accessing data that is adapted based on a first host, the request, and the data, wherein the data is stored at the first host;
- configuring the request to perform the operation on the data based on input received into the workflow presented in the user interface, wherein the operation is not a data protection operation performed by the data protection system;
- performing a data control process of the data protection application on the request by the data protection application; and
- performing the operation on the data in accordance with the request by the data protection application, wherein the operation on the data is separate from the data protection operation performed by the data protection application.

* * * * *